US010550989B2

(12) United States Patent
Noggle et al.

(10) Patent No.: US 10,550,989 B2
(45) Date of Patent: Feb. 4, 2020

(54) LATCH ASSEMBLY FOR USE WITH AN INVERSION DRUM

(71) Applicant: Earth Tool Company LLC, Lake Mills, WI (US)

(72) Inventors: Craig Lawrence Noggle, East Troy, WI (US); Robert F. Crane, Nekoosa, WI (US); Mark D. Randa, Oconomowoc, WI (US); Steven W. Wentworth, Scottsdale, AZ (US)

(73) Assignee: Earth Tool Company LLC, Lake Mills, WI (US)

( * ) Notice: Subject to any disclaimer, the term of this patent is extended or adjusted under 35 U.S.C. 154(b) by 4 days.

(21) Appl. No.: 16/042,128

(22) Filed: Jul. 23, 2018

(65) Prior Publication Data

US 2019/0063662 A1 Feb. 28, 2019

Related U.S. Application Data

(60) Provisional application No. 62/549,299, filed on Aug. 23, 2017.

(51) Int. Cl.
 *E05C 3/04* (2006.01)
 *F16L 55/18* (2006.01)
 *E05C 19/00* (2006.01)

(52) U.S. Cl.
 CPC .............. *F16L 55/18* (2013.01); *E05C 3/04* (2013.01); *E05C 19/002* (2013.01); *Y10T 292/0866* (2015.04); *Y10T 292/0892* (2015.04); *Y10T 292/11* (2015.04)

(58) Field of Classification Search
 CPC ......... Y10T 292/0863; Y10T 292/0864; Y10T 292/0866; Y10T 292/0886; Y10T 292/0887; Y10T 292/0892; Y10T 292/03; Y10S 292/11; Y10S 292/55; E05B 65/5246; E05B 65/5284; F16L 55/18; E05C 19/002; E05C 3/04
 USPC .............. 138/97, 98; 70/158–162, 166–169; 292/DIG. 11, DIG. 30, 59, 68
 See application file for complete search history.

(56) References Cited

U.S. PATENT DOCUMENTS

| | | | | |
|---|---|---|---|---|
| 1,157,039 | A * | 10/1915 | Pierce | E05B 65/0007 292/68 |
| 2,074,759 | A * | 3/1937 | Richards | E05B 65/0007 292/68 |
| 3,901,407 | A * | 8/1975 | Mitchell | B60K 15/04 220/315 |
| 4,413,848 | A * | 11/1983 | Leaver | E05B 63/125 292/59 |
| 6,050,300 | A * | 4/2000 | Schwert | F16L 55/1651 138/97 |

(Continued)

*Primary Examiner* — Patrick F Brinson
(74) *Attorney, Agent, or Firm* — Tomlinson McKinstry, P.C.

(57) ABSTRACT

A hinged cover overlays an opening that provides access to a pressurized inversion drum. A releasable latch assembly holds the cover in a closed and locked position. The latch assembly comprises a plurality of first knuckles formed in the cover that are interlaceable with a plurality of second knuckles formed in the body adjacent the opening. The latch assembly further comprises a rotatable latch pin that may be installed within the first and second knuckles. The latch assembly is moved from an unlocked to a locked position by rotation of the latch pin within the knuckles.

20 Claims, 19 Drawing Sheets

(56) References Cited

U.S. PATENT DOCUMENTS

| | | | | |
|---|---|---|---|---|
| 6,588,810 B1* | 7/2003 | Monneret | ........... | E02D 29/1427 |
| | | | | 292/100 |
| 6,705,650 B2* | 3/2004 | Ohnishi | ............. | F02M 35/0203 |
| | | | | 292/242 |
| 6,733,053 B2* | 5/2004 | Hodge | .................. | B65F 1/1615 |
| | | | | 292/285 |
| 2015/0020908 A1* | 1/2015 | Warren | ................... | B29C 63/36 |
| | | | | 138/97 |
| 2018/0292041 A1* | 10/2018 | Lokkinen | ............ | B29C 63/0073 |

* cited by examiner

US 10,550,989 B2

LATCH ASSEMBLY FOR USE WITH AN INVERSION DRUM

SUMMARY

The present invention is directed to an apparatus comprising a body having an opening formed therein, a cover sized to cover the opening, and a latch assembly. The latch assembly comprises a plurality of spaced and aligned first knuckles formed in a selected one of the cover and body, each first knuckle having an exposed semi-cylindrical groove formed therein, and a plurality of spaced and aligned second knuckles formed in the unselected one of the cover and body adjacent the opening. The latch assembly further comprises a rotatable latch pin having aligned and alternating first and second sections. Each first section of the latch pin has a size and shape complementary to the semi-cylindrical groove of a first knuckle.

The present invention is also directed to an apparatus comprising a body having an opening formed therein, a cover sized to cover the opening, and a latch assembly. The latch assembly comprises a plurality of knuckles formed in a selected one of the cover and body and a plurality of knuckles formed in the unselected one of the cover and body adjacent the opening. The plurality of first knuckles are configured to interlace with the plurality of second knuckles. The latch assembly further comprises a rotatable latch pin having a plurality of half-moon cross-sections.

DETAILED DESCRIPTION

Cured in Place Piping (CIPP) operations are performed to repair existing underground pipes. The operation involves the installation of a resin saturated, tubular liner within the existing pipe. The resin soaked liner cures against the interior of the pipe and seals any cracks or damaged areas.

A pressurized inversion drum is used to install the liner within the existing pipe. The interior of the liner is typically made of felt while the outside of the liner is typically made of a water resistant material. In operation, the felt interior of the tubular liner is first filled with resin. The resin-filled liner is flattened and installed within the drum by coiling it around a spindle supported within the drum. Once the liner is installed in the drum, the interior of the drum may be pressurized.

The pressure inside the drum operates to invert and expand the liner into the existing pipe as it is discharged from the drum. Because the liner is inverted as it expands the length of the existing pipe, the resin soaked surface of the liner contacts the interior walls of the pipe. Water may be pumped into the interior of the inverted liner to help expand the liner throughout the pipe as the resin cures adjacent to the pipe walls. In alternative embodiments, steam or UV light may be used to cure the resin to the pipe walls.

The resin used to saturate the liner is typically mixed with a hardening agent. If the hardening agent sets before the liner is installed within the pipe, the liner is no longer usable. Thus, time is of the essence with performing CIPP operations.

Inversion drums known in the art have access ports that are sealed using multiple threaded fasteners. Each fastener may have a knob that requires a dozen or so revolutions before it becomes unfastened. Such fasteners take time to engage or release. The covers used with such access ports also typically need to be completely detached from the drum prior to installing the liner within the drum.

The present invention is directed to a latch assembly that allows rapid access to the interior of an inversion drum to quickly install a tubular liner within the drum. The latch assembly also allows for rapid sealing of the drum in order to quickly pressurize the interior of the drum.

Figure 1:
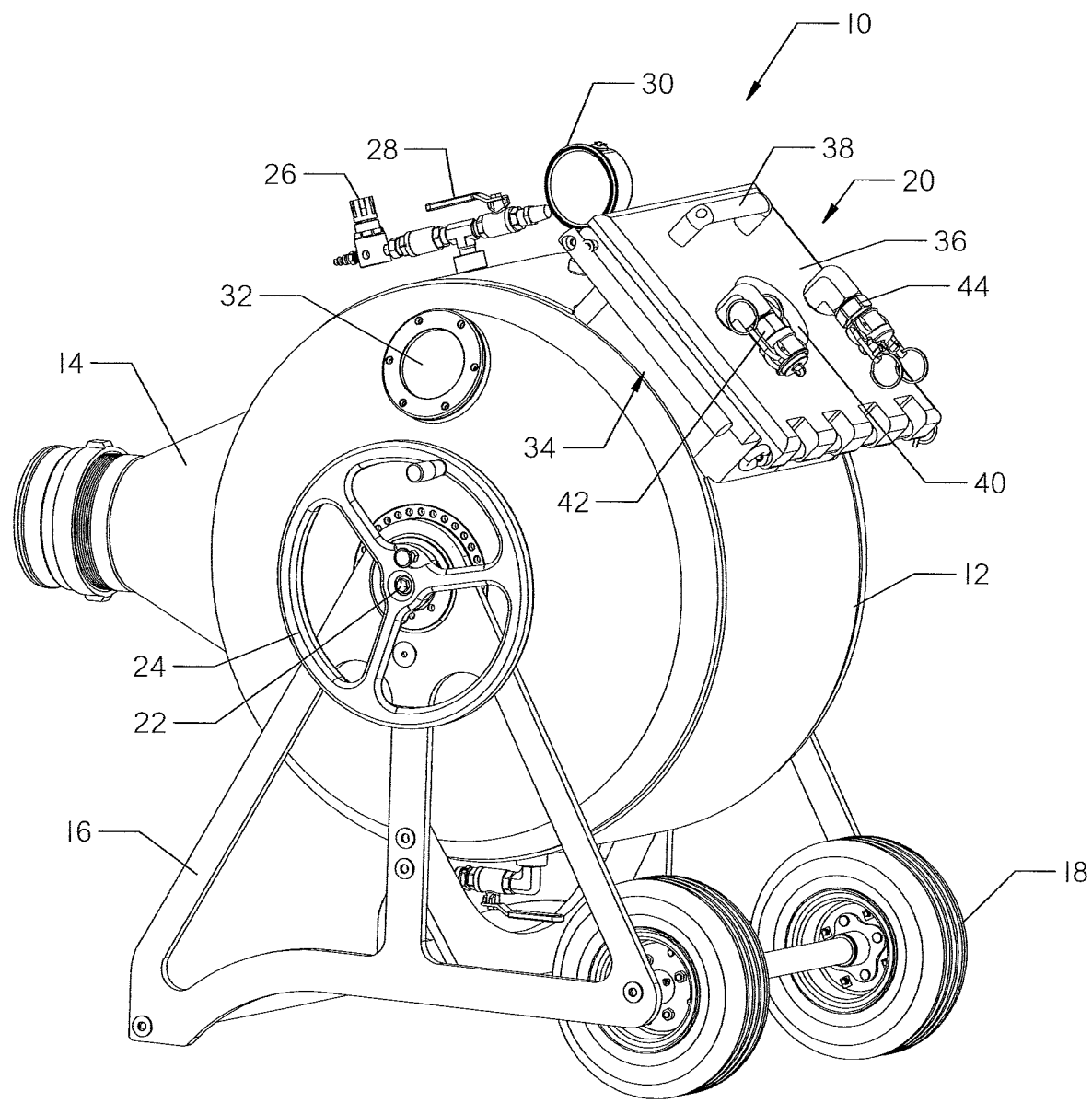
FIG. 1 is a perspective view of an inversion drum utilizing a latch assembly of the present invention. The latch assembly is shown in an unlocked position.

With reference to FIG. 1, a pressurized inversion drum 10 is shown. The inversion drum 10 comprises a cylindrical body 12 joined to a discharge cone 14. The body 12 is supported on a frame 16 and may be transported using a set of wheels 18 attached to the frame.

A tubular liner (not shown) is installed in the drum 10 through an access port 20. Once inside the drum 10, the liner is wound around a spindle 22 by a handwheel 24. The liner is discharged from the drum 10 in an inverted form through the discharge cone 14. An air regulator 26, ball valve 28, and pressure gage 30 are supported on the top of the body 12. These items allow an operator to pressurize the drum 10 for the inversion process. The operator may view the inside of the drum 10 using a first sight glass 32 installed in the drum body 12.

The access port 20 is supported on the top of the drum 10 and comprises a body 34 sealed by a cover 36. The cover 36 may be opened and closed using a handle 38 attached to the cover. A second sight glass 40 is installed in the cover 36 in order to allow the operator to view the inside of the drum 10. A set of hose connections 42, 44 are also installed in the cover 36. The hose connections 42, 44 allow water to be circulated throughout the drum 10 to either retard or accelerate setup of the resin contained within the liner.

Figure 2:
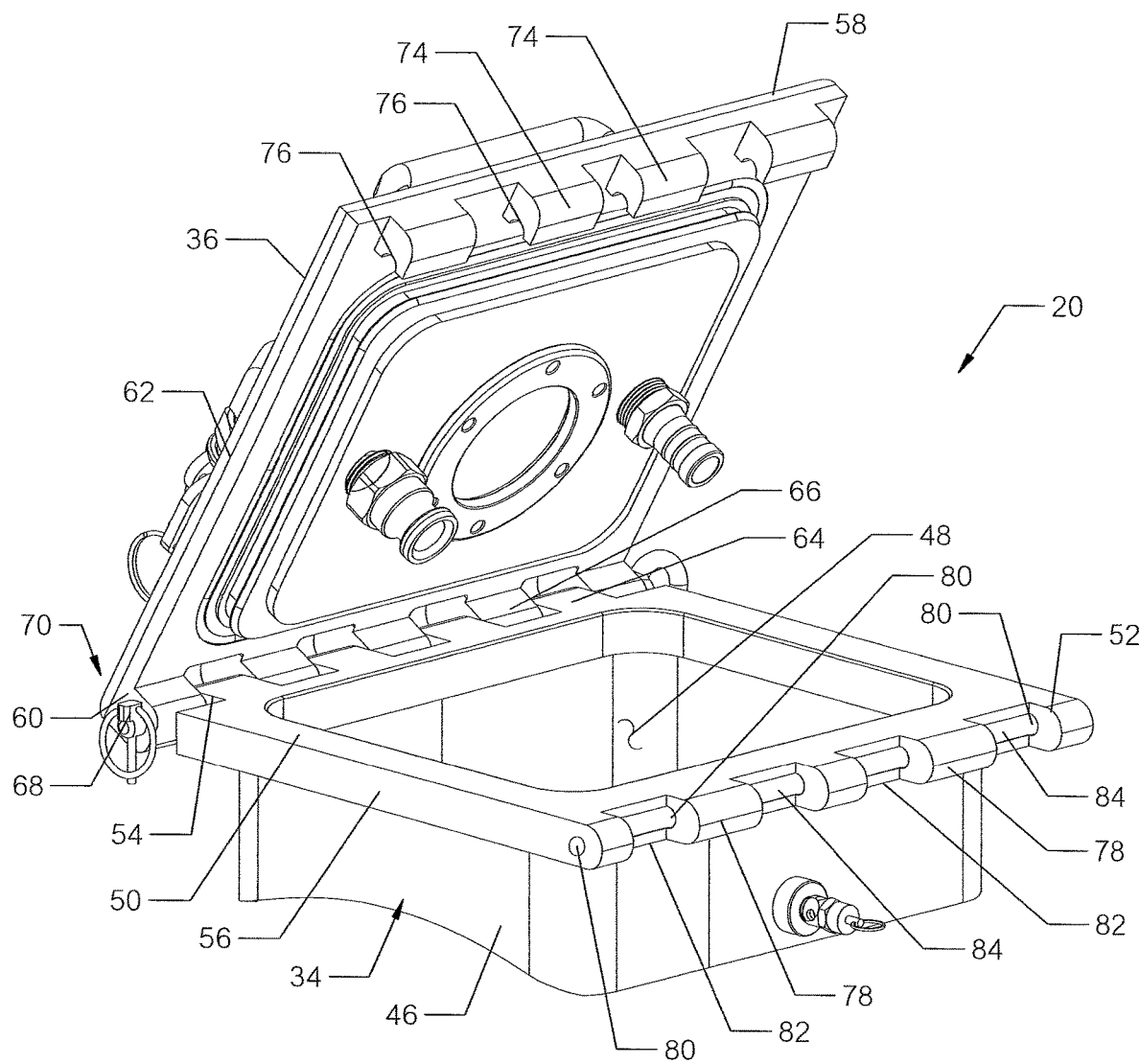
FIG. 2 is a perspective view of a body and cover configured for use with the latch assembly. The cover is shown in an open position and the latch assembly is shown in an unlocked position. A latch pin used with the latch assembly has been removed for clarity.

Turning to FIG. 2, the body 34 of the access port 20 comprises a standoff 46 having a central opening 48 formed therein. As shown in FIG. 1, the bottom edge of the standoff 46 is attached to the body 12 of the drum 10 and surrounds an opening (not shown) formed in the drum body 12. The tubular liner is installed within the drum 10 by passing through the opening 48 formed in the standoff 46 and the opening formed in the body 12 of the drum 10.

A flange 50 is supported on the top edge of the standoff 46 that surrounds the central opening 48. The flange 50 is bounded by a first end 52, an opposite second end 54, and side edges 56. Likewise, the cover 36 is bounded by a first end 58, an opposite second end 60, and side edges 62. Both the cover 36 and flange 50 have knuckles 64, 66 formed on their second ends 54, 60 that are configured to mate and receive a pin 68. Installation of the pin 68 within the knuckles 64, 66 rotatably secures the cover 36 to the flange 50 in the form of a hinged joint 70.

In alternative embodiments, the standoff 46 may not be used. Instead the flange 50 may be formed as part of the body 12 of the drum 10. In such embodiment, the flange 50 would surround the opening (not shown) formed in the drum body 12.

FIG. 2 shows the cover 36 in an open position. The cover 36 is shown in a closed position in FIG. 1. The cover 36 rotates between an open and closed position via the hinged joint 70. When closed, the cover 36 is sized to cover the opening 48 and mate with the flange 50 such that the side edges 62 of the cover 36 are flush with the side edges 56 of the flange 50.

Figure 3:
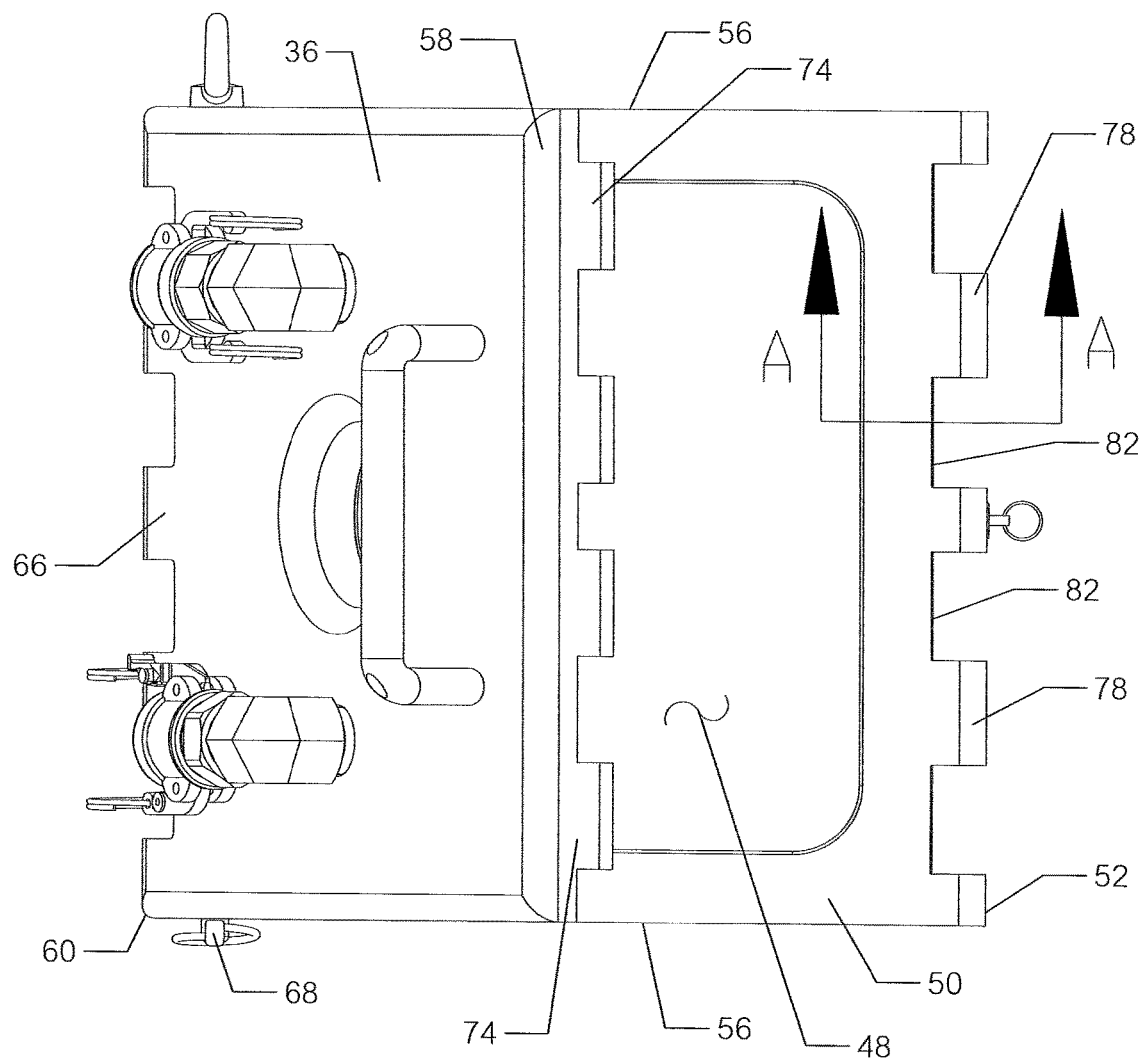
FIG. 3 is a top plan view of the body and cover shown in FIG. 2.
Figure 4:
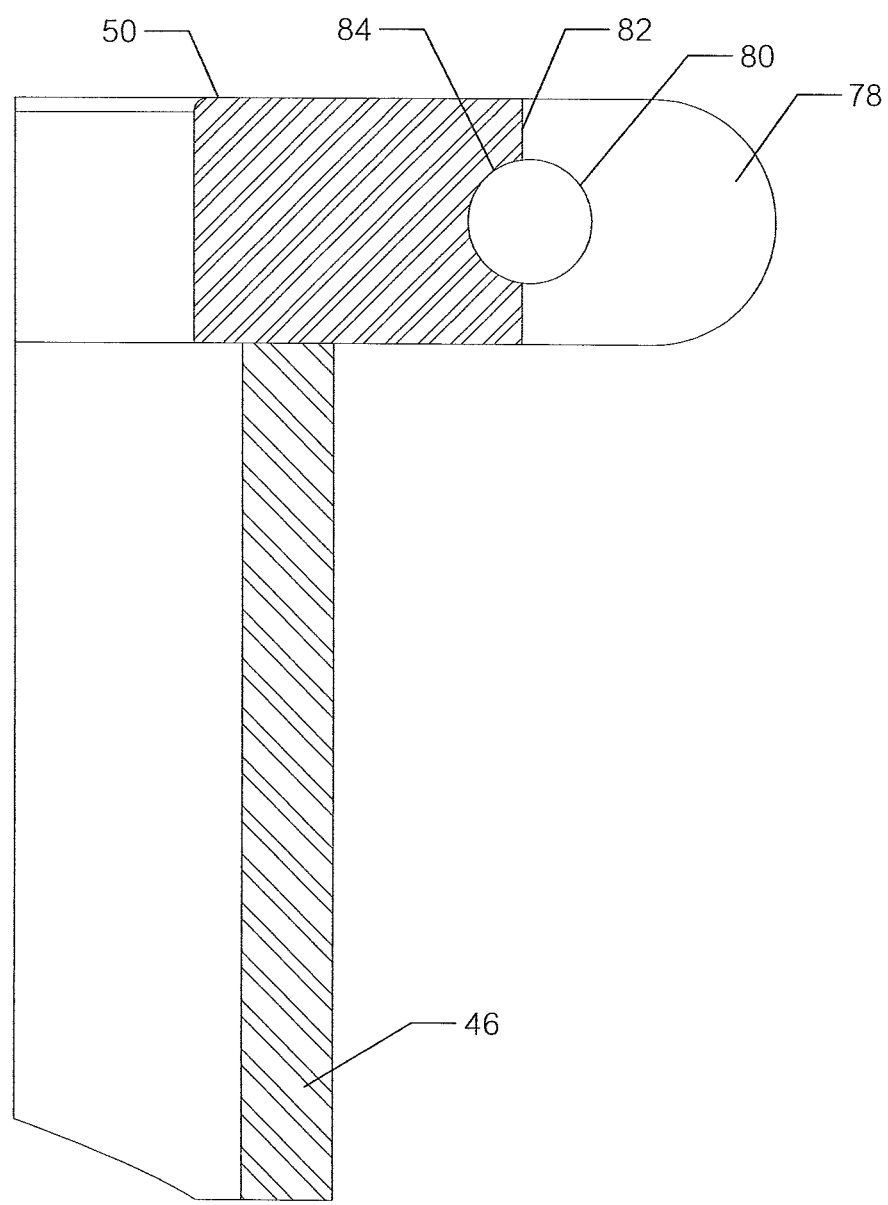
FIG. 4 is a cross-sectional view of a portion of the latch assembly formed in the body, taken along line A-A from FIG. 3.
Figure 10:
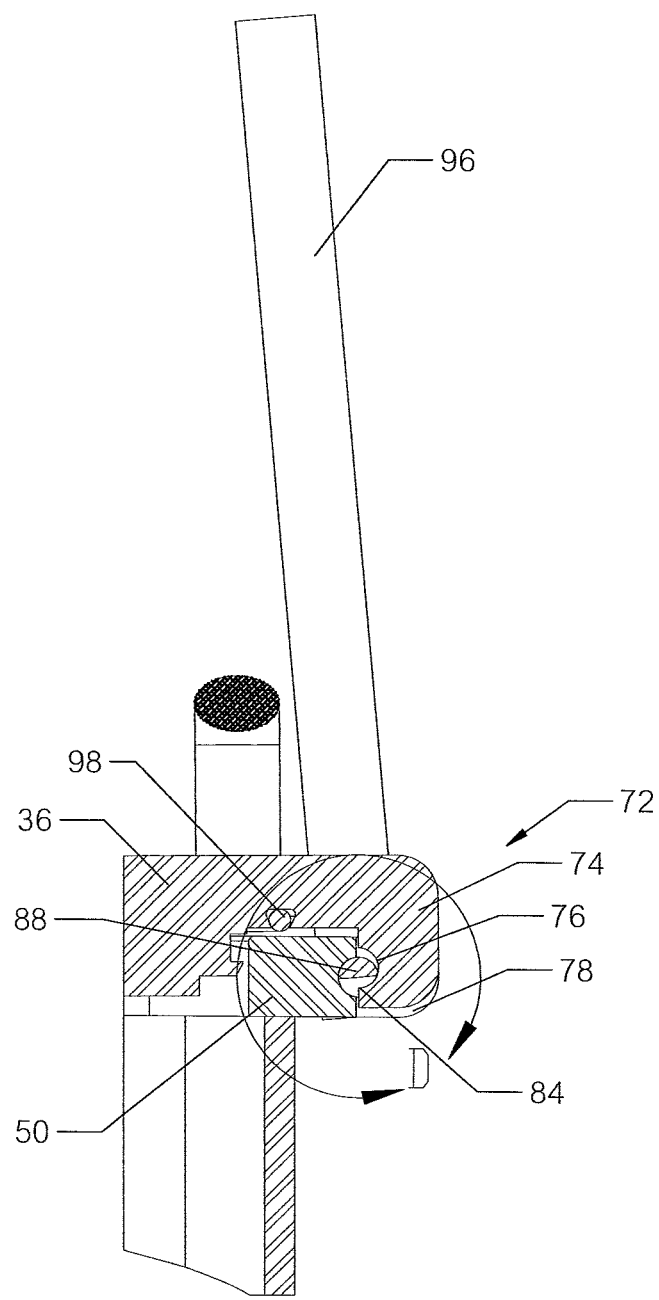
FIG. 10 is a cross-sectional view of the latch assembly in the engaged position, taken along line C-C from FIG. 9.
Figure 13:
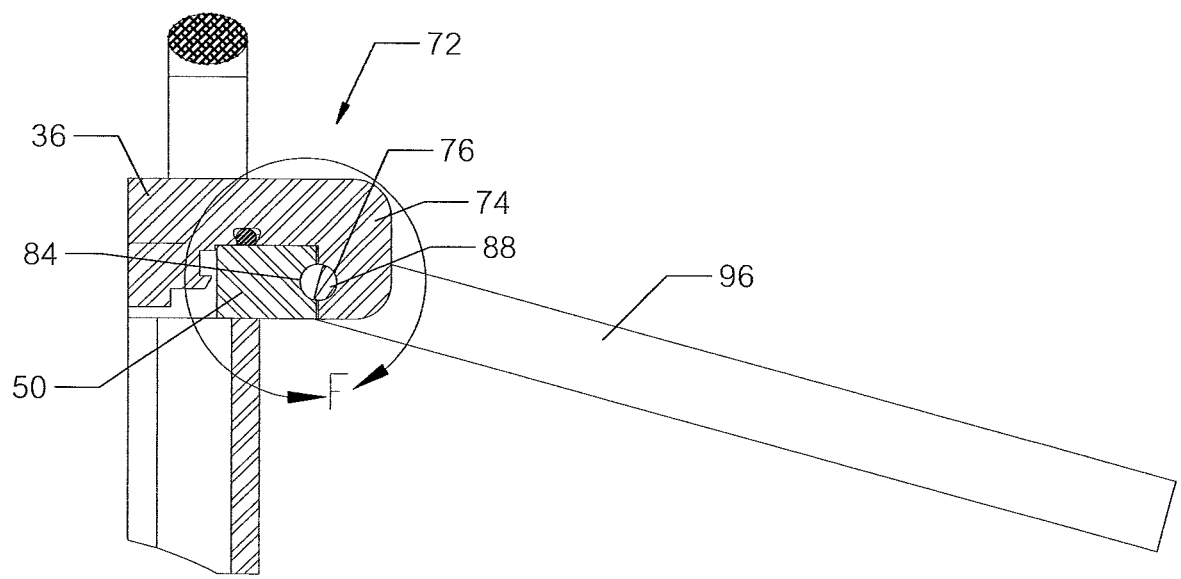
FIG. 13 is a cross-sectional view of the latch assembly in the locked position, taken along line E-E from FIG. 12.

The cover 36 is locked to the body 34 by a latch assembly 72, the entirety of which is shown in FIGS. 10 and 13. With reference to FIGS. 2-4, a portion of the latch assembly 72 comprises a plurality of spaced and aligned first knuckles 74 formed in the first end 58 of the cover 36. Each of the first knuckles 74 extends downwards from the bottom surface of the first end 58 of the cover 36. A first exposed semi-cylindrical groove 76 is formed in the inner surface of each of the first knuckles 74. Each of the grooves 76 opens towards the second end 60 of the cover 36. In one embodiment, the outer surface of each first knuckle 74 is rounded.

The latch assembly 72, further comprises a plurality of spaced and aligned second knuckles 78 formed in the first end 52 of the flange 50 adjacent the opening 48. Each of the second knuckles 78 is integral with the first end 52 of the flange 50. A short cylindrical passage 80 extends through each second knuckle 78. In one embodiment, the outer surface of each second knuckle 78 is rounded.

A notch 82 is formed in the first end 52 of the flange 50 between each second knuckle 78. Each of the notches 82 are bounded on each side by adjacent second knuckles 78. A second exposed semi-cylindrical groove 84 is formed in the flange 50 within each notch 82. Each of the grooves 84 extends the length of each notch 82 and joins each passage 80 formed in each second knuckle 78, as shown in FIG. 4.

The plurality of first knuckles 74 are spaced so that they are vertically alignable with each of the notches 82 in a one-to-one relationship. Thus, when the cover 36 is rotated to a closed position, each of the first knuckles 74 is positioned within a corresponding one of the notches 82. The plurality of first and second knuckles 74, 78 are interlaced with one another when the cover 36 is in the closed position. In one embodiment, the outer surfaces of each first and second knuckle 74, 78 are identical in shape and construction so as to form a smooth edge when interlaced.

When the knuckles 74, 78 are interlaced, each of the first semi-cylindrical grooves 76 aligns with a corresponding one of the second semi-cylindrical grooves 84 in a one-to-one relationship. The aligned grooves 76, 84 join each of the short passages 80 so as to form a single passage, as shown in FIG. 13. As shown in FIGS. 2-3, each of the knuckles 74, 78 may vary in length. In alternative embodiments, each of the knuckles 74, 78 may be the same length.

In alternative embodiments, the plurality of first knuckles 74 may be formed in the body 34 instead of the cover 36. In such case, the plurality of second knuckles 78 are formed in the cover 36 instead of the body 34.

Figure 5:
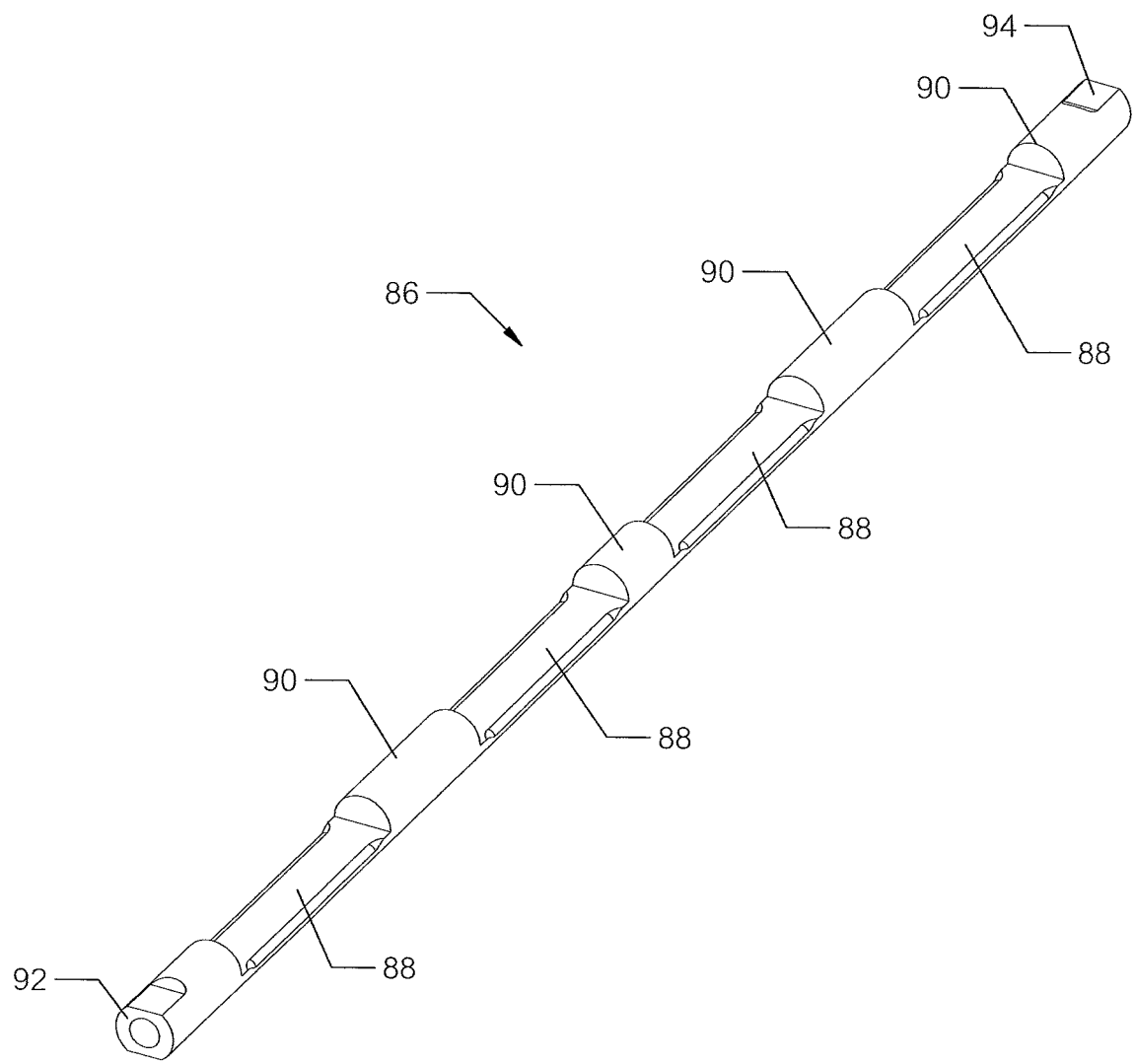
FIG. 5 is a perspective view of the latch pin used with the latch assembly.
Figure 6:
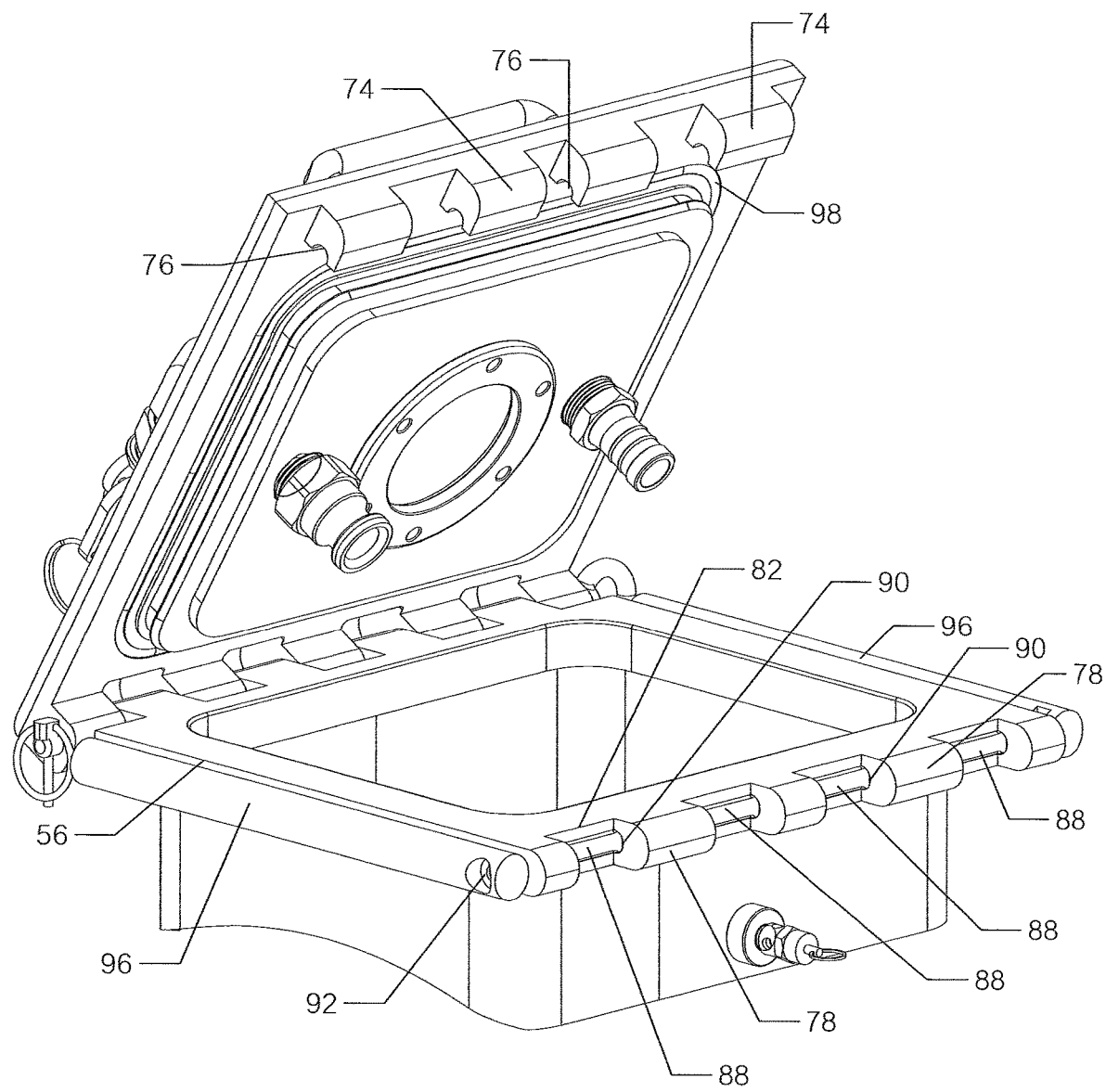
FIG. 6 is a perspective view of the body and cover shown in FIG. 3. The cover is shown in the open position and the latch assembly is shown in an unlocked position. The latch pin is shown installed within the body.

Turning to FIGS. 5-6, the latch assembly 72 further comprises a rotatable latch pin 86. The latch pin 86 has aligned and alternating first and second sections 88, 90 that are bounded by a first and second end 92, 94. Each first section 88 has a semicircular cross-sectional shape resembling a half moon. Each first section 88 is complementary in size and shape to each of the first and second grooves 76, 84. The first sections 88 are aligned with the longitudinal axis of the latch pin 86.

Each of the second sections 90 of the latch pin 86 has a size and shape complementary to the short cylindrical passages 80 formed in each of the second knuckles 78. The latch pin 86 is installed within the flange 50 so that it extends through each second knuckle 78, as shown in FIG. 6. The length of each second section 90 may correspond with the length of each second knuckle 78.

A handle 96 is rigidly attached to each opposed end 92, 94 of the latch pin 86, as shown in FIG. 6. In one embodiment, each of the handles 96 is a rod that extends the length of each side edge 56 of the flange 50. In alternative embodiments, only a single handle 96 may be attached to the latch pin 86.

Figure 7:
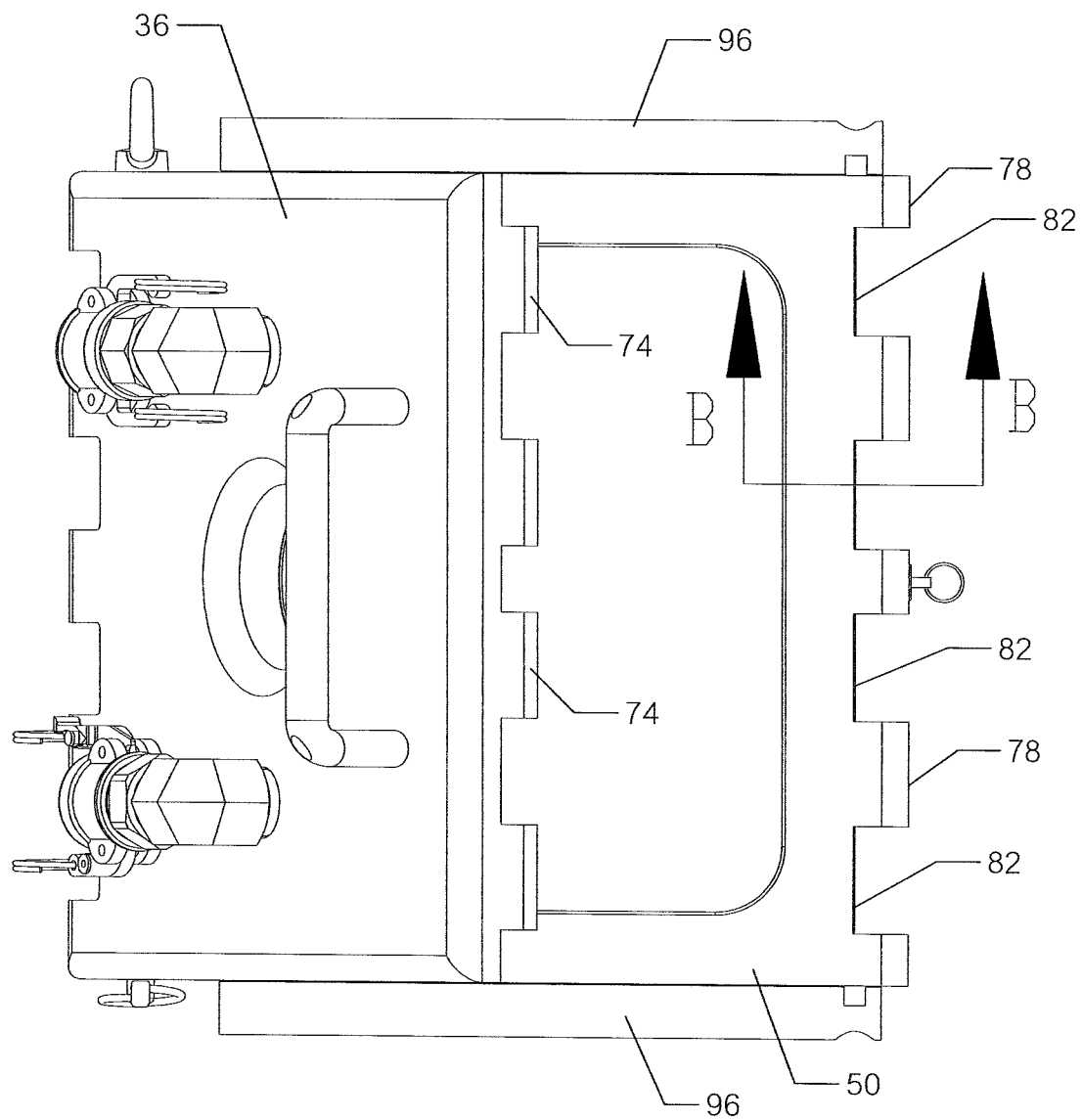
FIG. 7 is a top plan view of the body and cover shown in FIG. 6.
Figure 8:
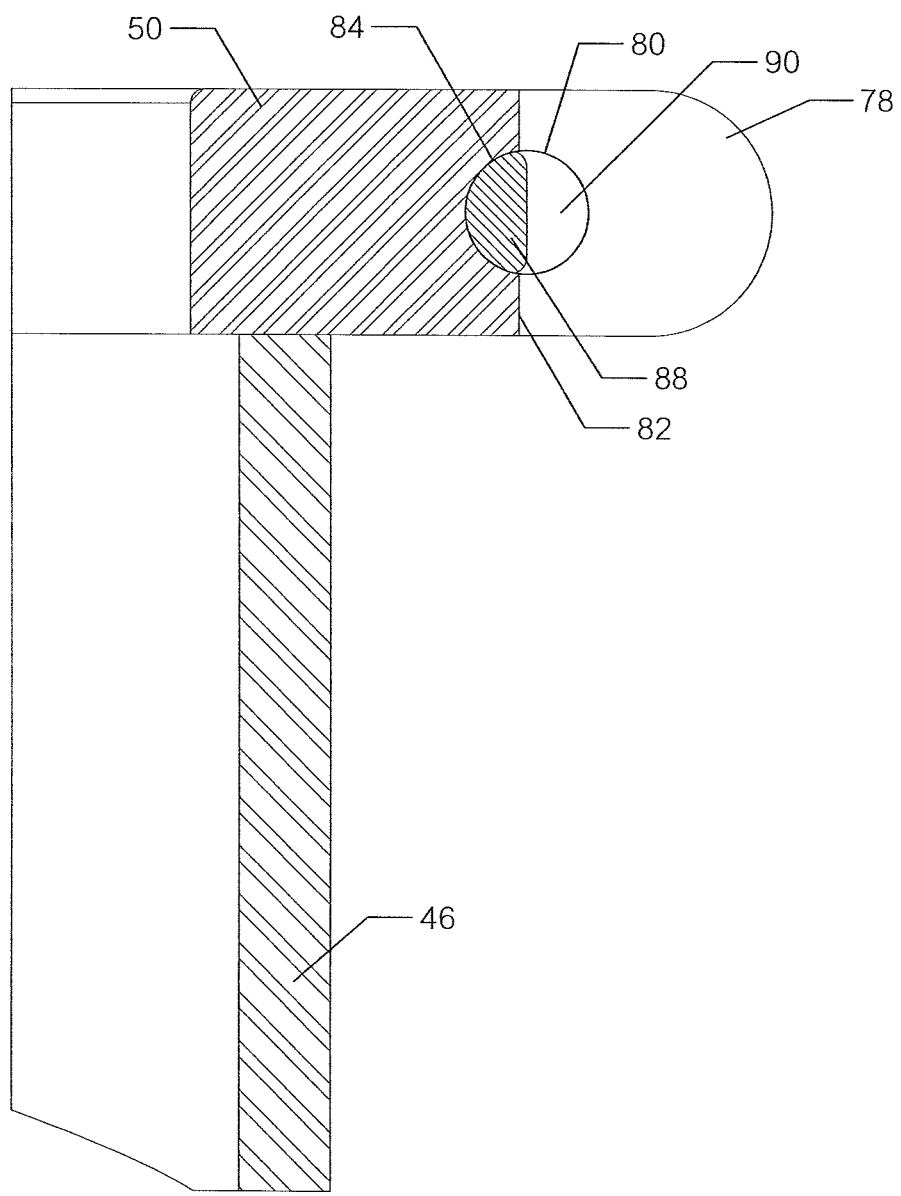
FIG. 8 is a cross-sectional view of a portion of the latch assembly formed in the body, taken along line B-B from FIG. 7.

Turning to FIGS. 7-8, when the latch pin 86 is installed within the flange 50, each first section 88 is positioned within each second groove 84 and each second section 90 is positioned within each short passage 80. When the latch pin 86 is in this position, each of the notches 82 is clear to receive a corresponding one of the first knuckles 74, as shown in FIG. 7.

The latch assembly 72 is in the unlocked position when the notches 82 are clear of the latch pin 86. In this position, the handles 96 are positioned adjacent the side edges 56 of the flange 50, as shown in FIG. 7. When the notches 82 are clear of the latch pin 86, the cover 36 may rotate between its open and closed positions, as shown in FIGS. 1-2.

Clockwise rotation of the handles 98 rotates the latch pin 86 clockwise within the flange 50, and causes the latch assembly 72 to move from an unlocked to a locked position. Once the cover 36 is in a closed position, the first and second knuckles 74, 78 are interlaced. With the cover 36 so positioned, the latch assembly 72 may be moved from the unlocked position to a locked position.

Figure 9:
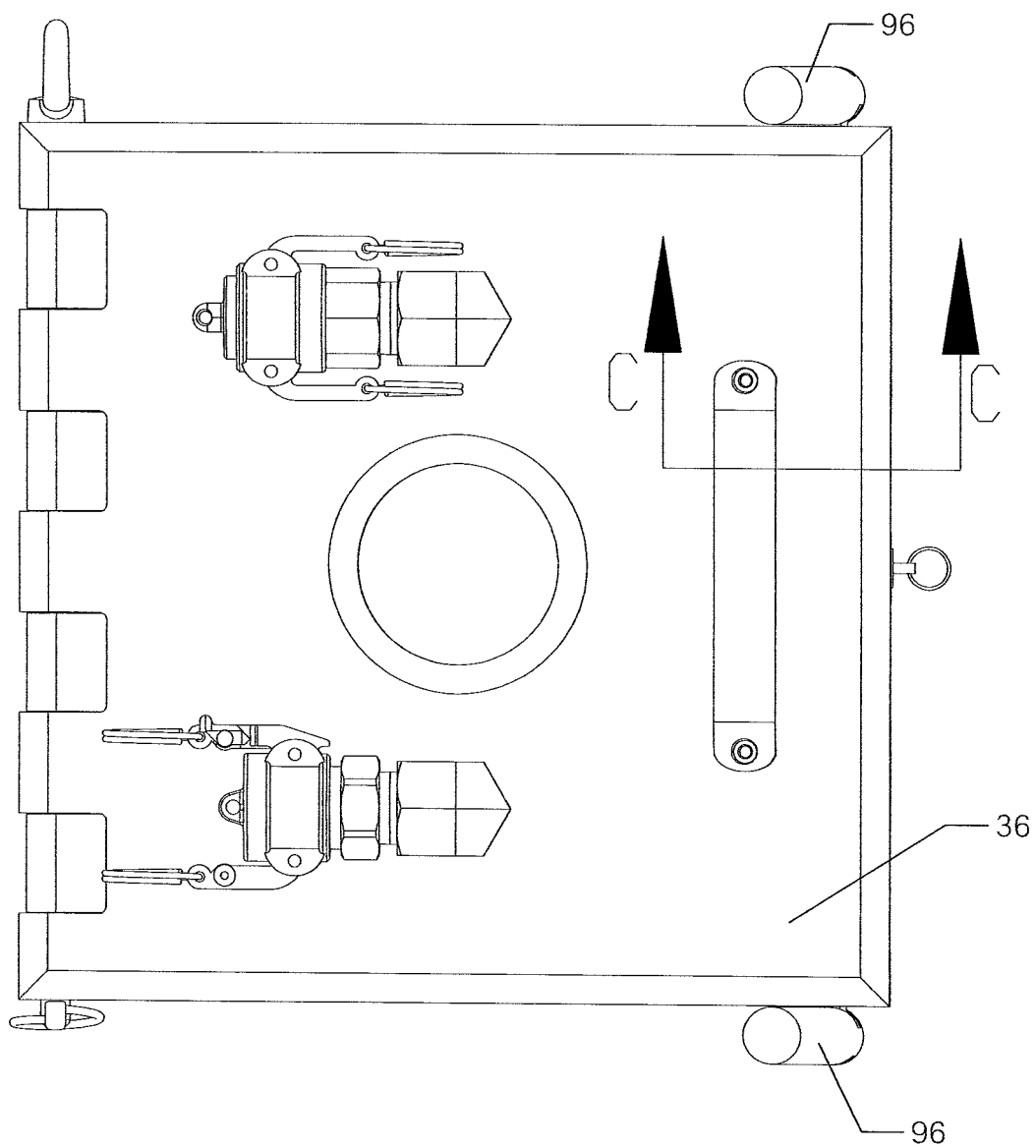
FIG. 9 is a top plan view of the cover in a closed position. The latch assembly is shown in an engaged position.
Figure 11:
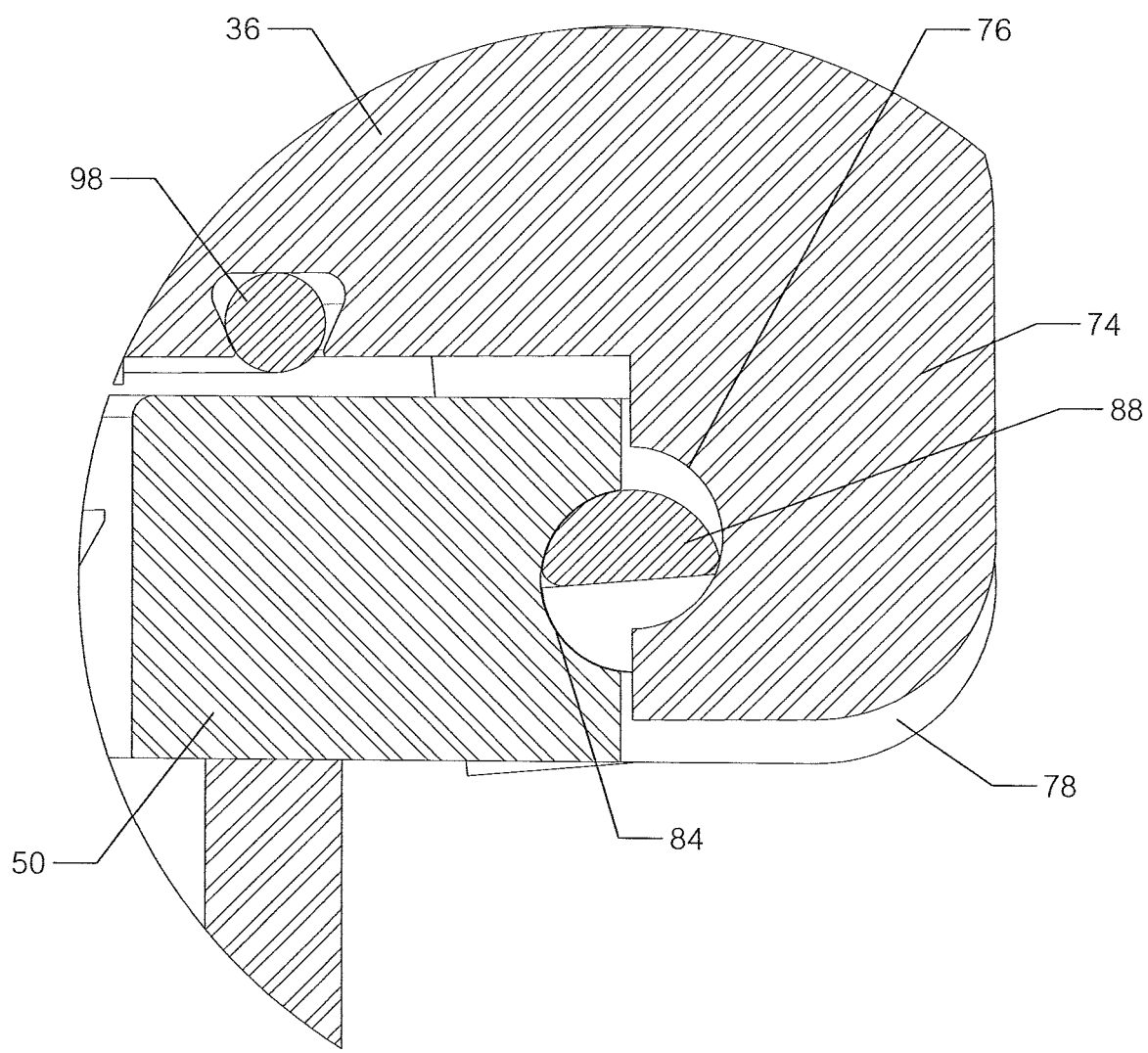
FIG. 11 is an enlarged view of area D shown in FIG. 10.

During an intermediate stage of the transition between unlocked and locked positions, the latch assembly 72 reaches the engaged position shown in FIGS. 9-11. Each of the first sections 88 has moved partially out of the second groove 84 and partially into the first groove 76, as shown in FIGS. 10-11. In this position, the latch pin 86 engages both the first and second knuckles 74, 78.

Figure 12:
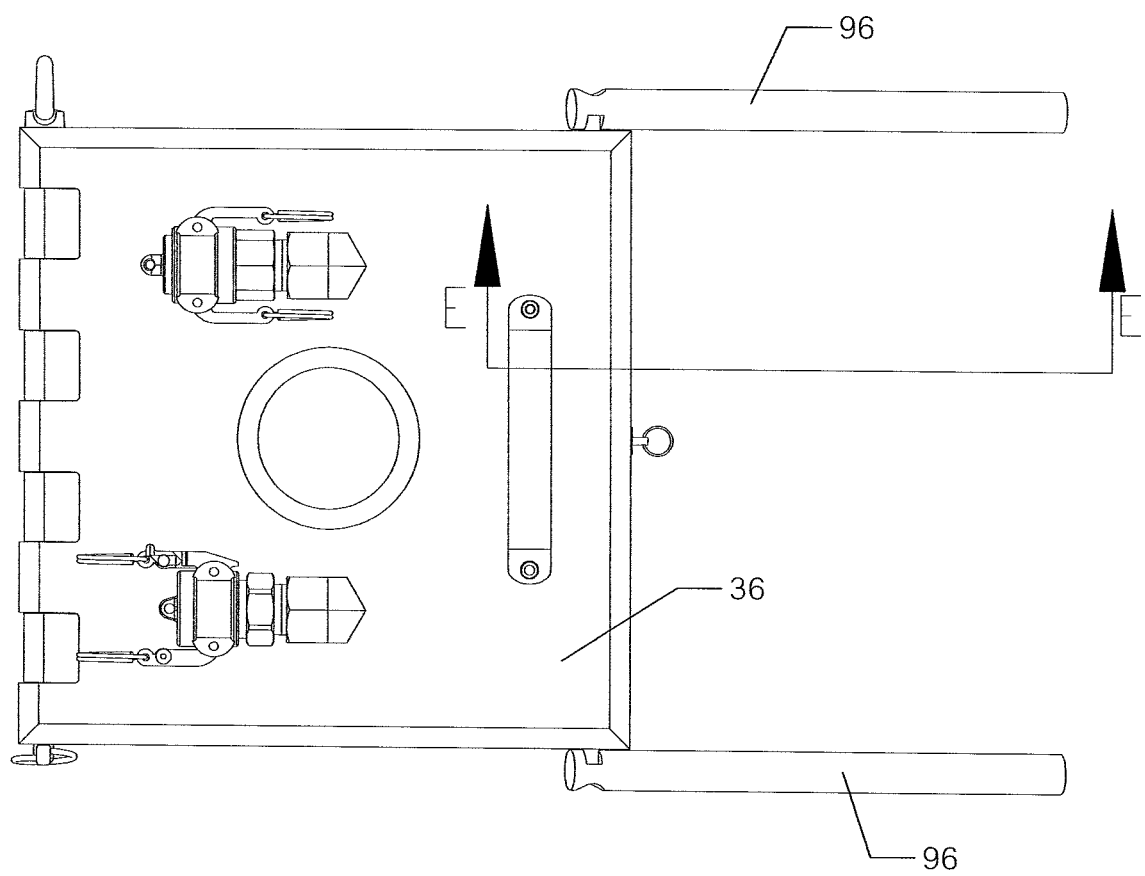
FIG. 12 is a top plan view of the cover in the closed position. The latch assembly is shown in a locked position.
Figure 14:
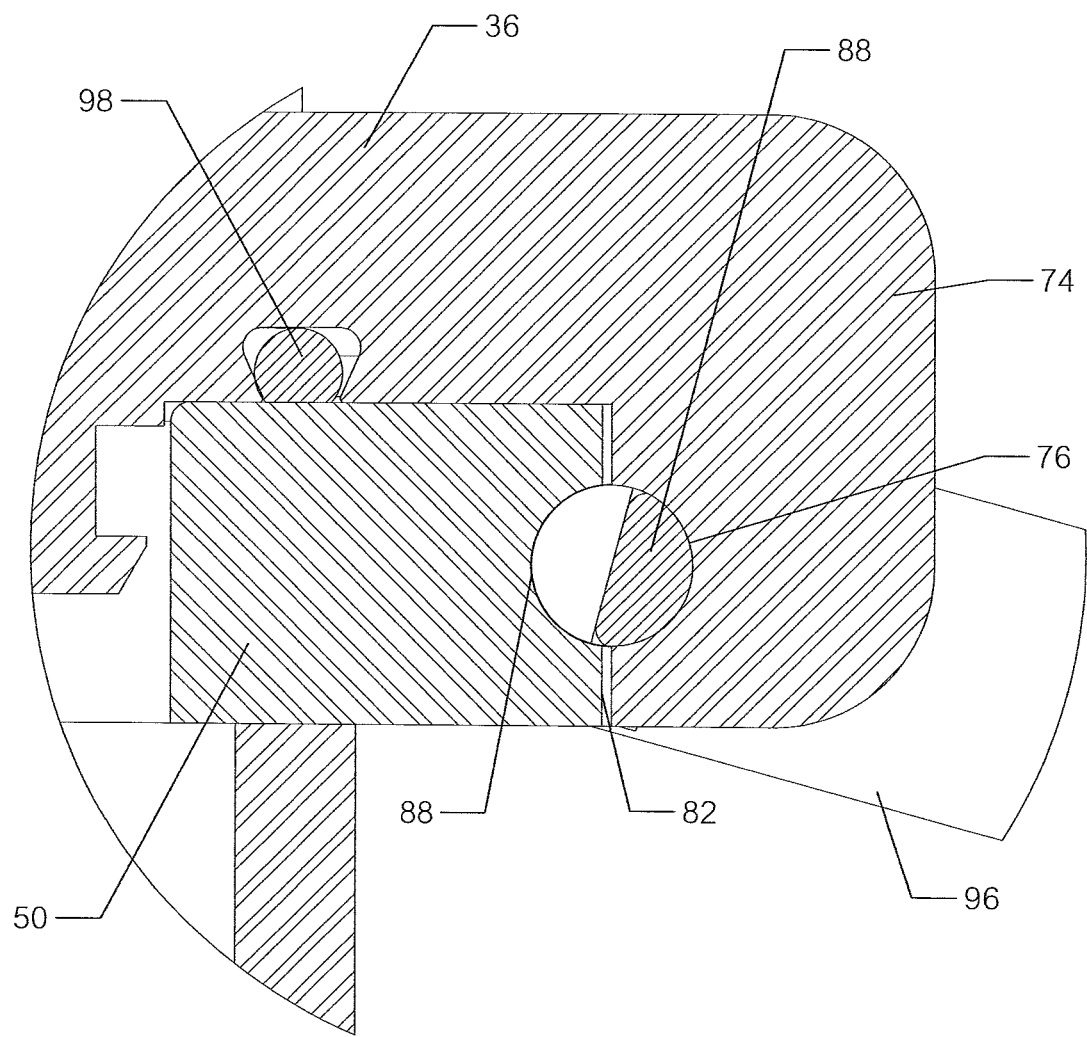
FIG. 14 is an enlarged view of area F shown in FIG. 13.

Further clockwise rotation of the handles 96 moves the latch assembly 72 from the engaged position to the locked position shown in FIGS. 12-14. Such rotation moves the first sections 88 entirely or substantially entirely within the first grooves 76, as shown in FIGS. 13-14. In the locked position of the cover 36, the first knuckles are prevented from moving vertically within the notches 82. Thus, the cover 36 is locked to the flange 50.

The latch assembly 72 may be moved to an unlocked position by counterclockwise rotation of the handles 96, which causes each first section 88 to move out of a first groove 76 and into a second groove 84. When the cover 36 is unlocked, the handles 96 are positioned adjacent the sides edges 56 of the flange 50.

Once the first sections 88 are fully positioned in the first grooves 76, the first knuckles 74 are free to move out of the notches 82. Thus, the cover 36 is free to rotate about the hinge joint 70 to the open position, shown in FIGS. 2 and 6.

Rotation of the handles 96 through an included angle of 180 degrees moves the latch assembly 72 between its locked and unlocked positions. When the cover 36 is locked, as shown in FIG. 12, the handles extend away from both the cover 36 and the flange 50. When the cover 36 is unlocked, the handles are positioned adjacent the side edges 56 of the flange 50.

When the interior of the drum 10 is under pressure, the locked latch assembly 72 can resist substantial opening forces applied to the cover 36. The resistance is attributable to the lack of eccentricity between the first sections 88 and the rotational axis of the latch pin 86. As a result, there is no tendency for the force applied to the interior of the cover 36 to rotate the latch pin 86 to the unlocked position.

For example, if pressure within the drum is 40 psi, the latch assembly 72 may resist up to 5,000 pounds of force applied to the cover 36. Yet the latch assembly 72 needs only a relatively small amount of force to seal the cover 36 over the opening 48.

With reference to FIGS. 6, 10-11, and 13-14, a seal 98 is positioned on the bottom surface of the cover 36. The seal 98 is sized to surround the opening 48, as shown in FIG. 6. The seal 98 engages the flange 50 when the cover 36 is in the closed position. In one embodiment, the seal 98 is an O-ring. Locking of the latch assembly 72 compresses the seal 98 tightly against the flange 50, so that pressure can be maintained in the drum 10.

In alternative embodiments, the diameter of each first section 88 may be offset from the longitudinal axis of the latch pin 86. Such design provides a tighter lock between the first and second knuckles 74, 78 and in turn provides greater compression of the seal 96. Greater compression may be required if a larger seal is used in place of the O-ring shown herein.

With reference to FIGS. 15-19, an alternative embodiment of the latch assembly 100 is shown for use with the inversion drum 10. The latch assembly 100 uses the same cover 36, body 34, and latch pin 86 used with latch assembly 72, shown in FIGS. 1-14. However, the latch assembly 100 utilizes a different handle system 102.

Like handles 96, the handles 102 are rigidly attached to opposite ends 92, 94 of the latch pin 86. Each of the handles 102 is substantially rectangular in shape and has a series of grips 104 formed on its bottom surface. Unlike the handles 96, the handles 102 extend less than half the length of the side edges 56 of the flange 50.

Figure 17:
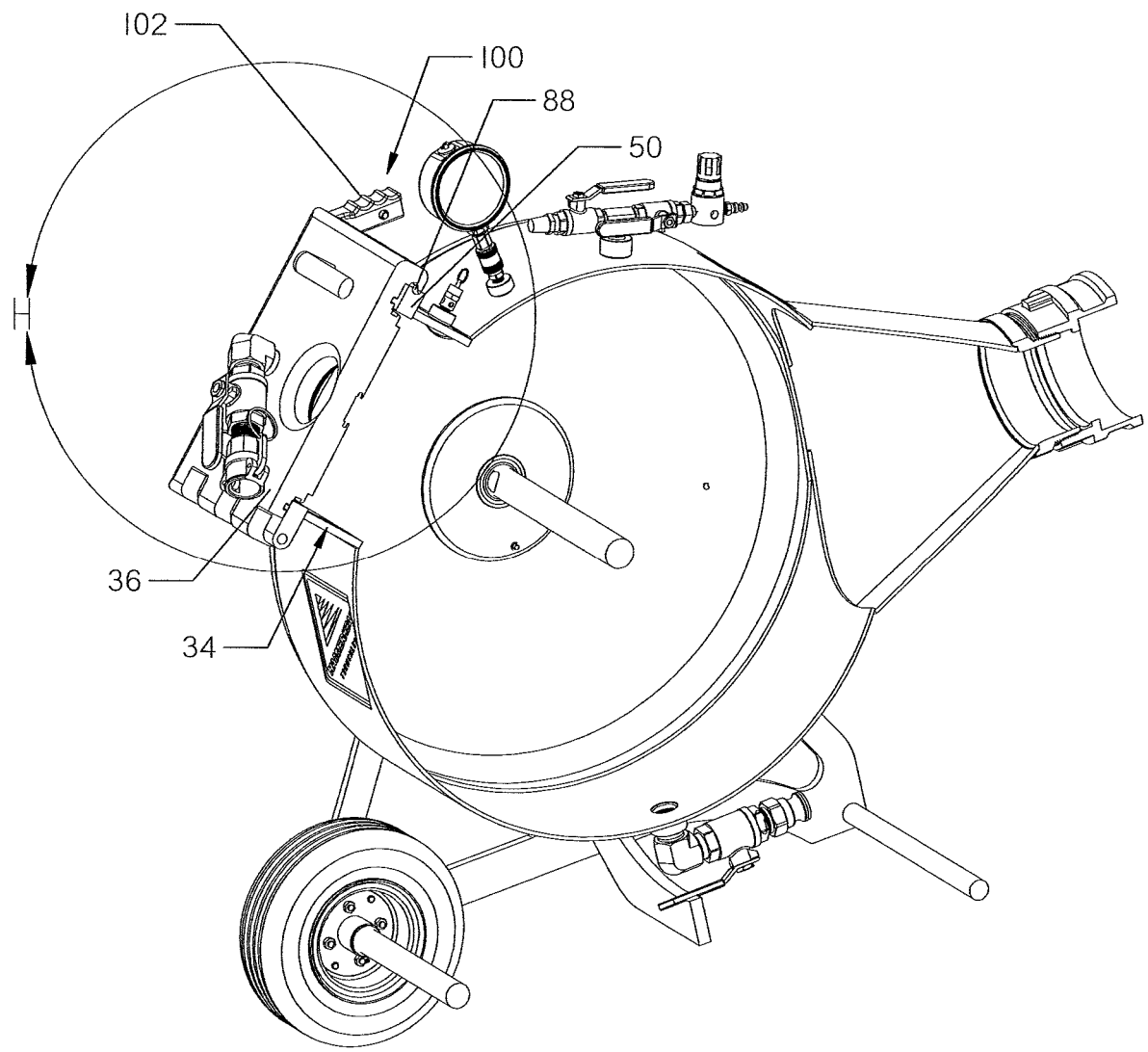
FIG. 17 is a perspective view of the inversion drum shown in FIG. 15. A portion of the drum has been cut-away for better display. The latch assembly is shown in an unlocked position.
Figure 18:
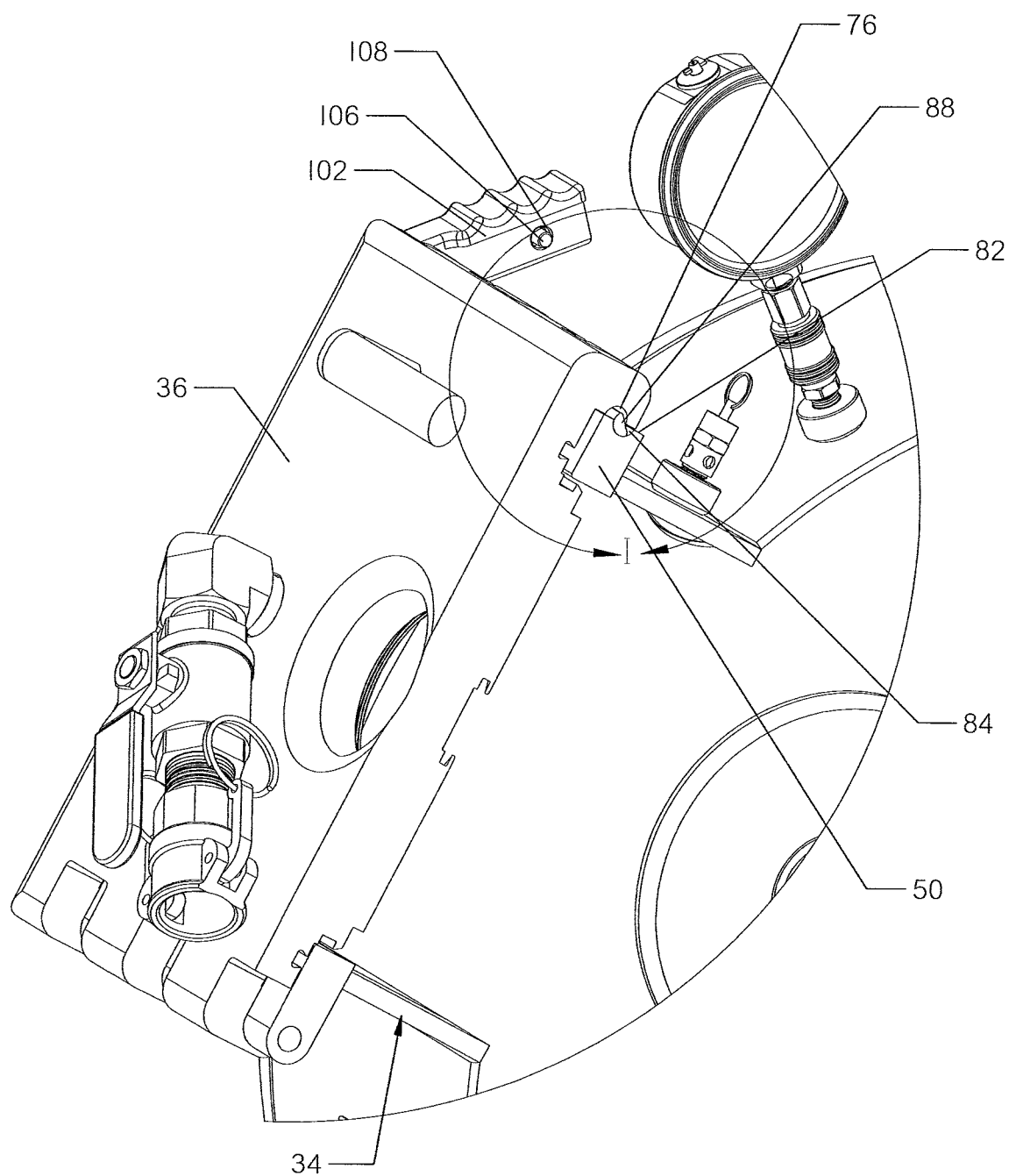
FIG. 18 is an enlarged view of area H shown in FIG. 17.
Figure 19:
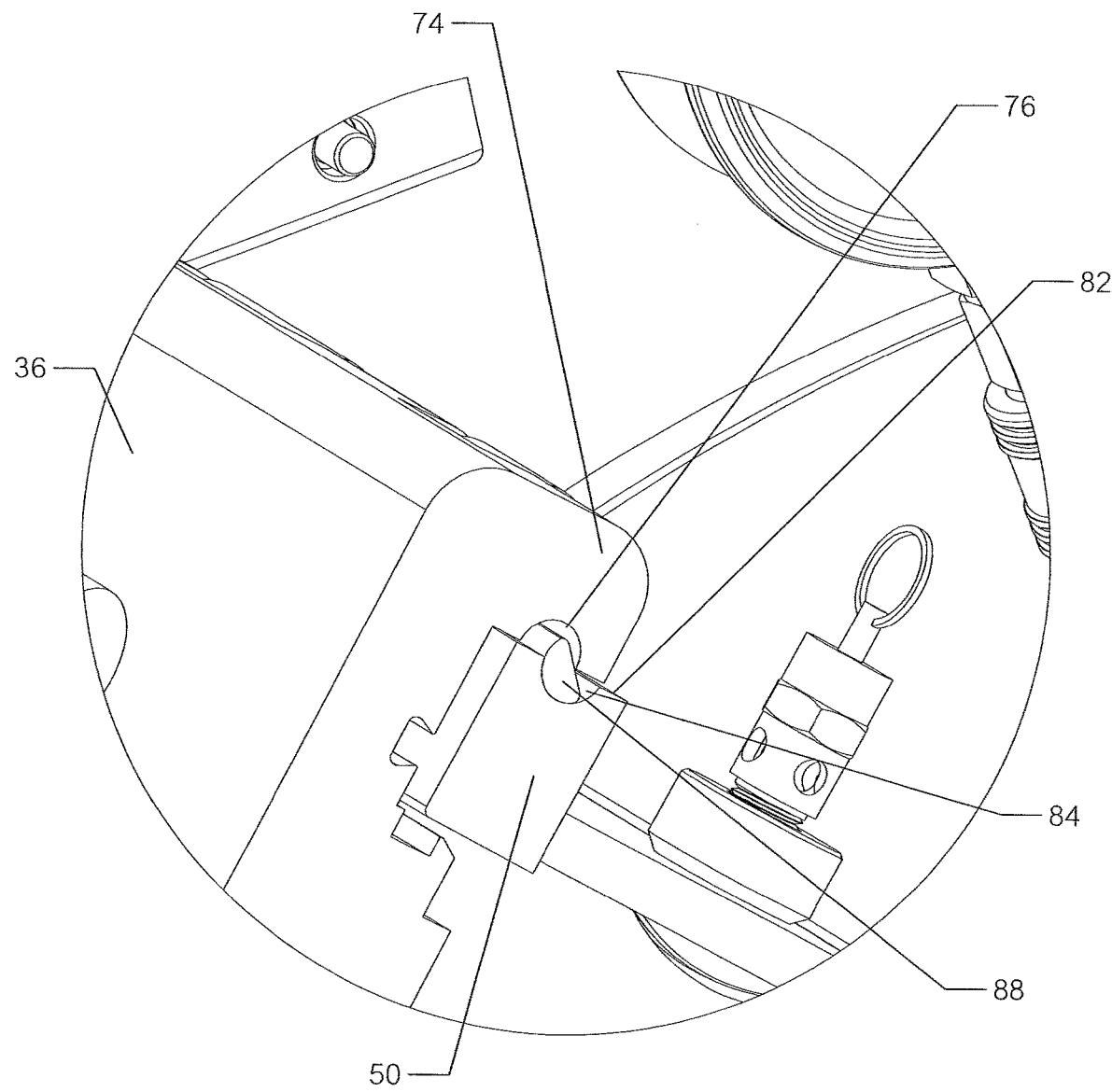
FIG. 19 is an enlarged view of area I shown in FIG. 18.

With reference to FIGS. 17-19, the latch assembly 100 operates the latch pin 86 is the same manner as latch assembly 72. However, the handles 102 are rotated clockwise to unlock the latch assembly 100, rather than to lock it. The first sections 88 are positioned within the second grooves 84 when the handles 102 are extended away from the cover 36 and flange 50.

Figure 15:
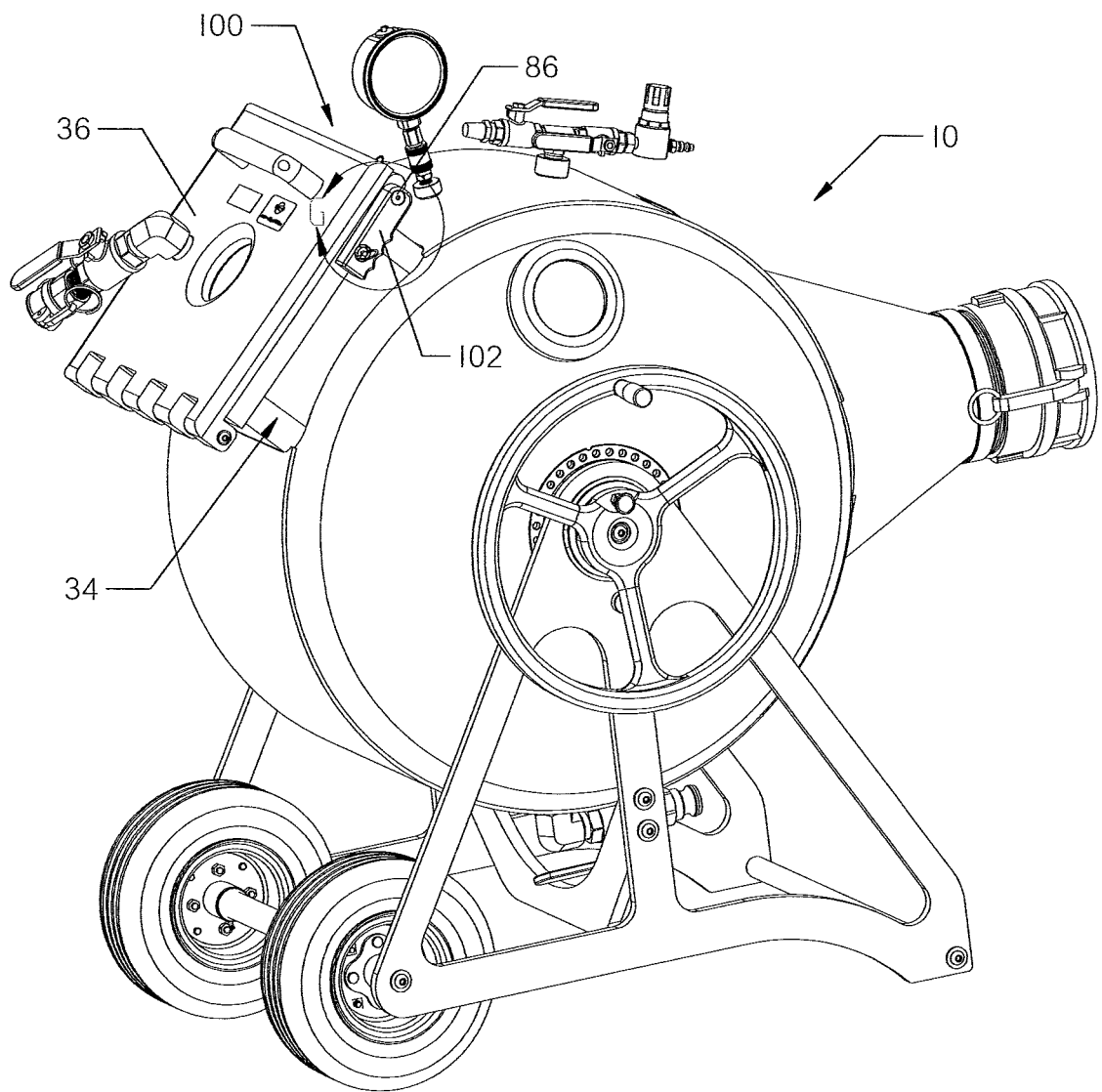
FIG. 15 is a perspective view of an inversion drum utilizing an alternative embodiment of the latch assembly. The latch assembly is shown in a locked position.
Figure 16:
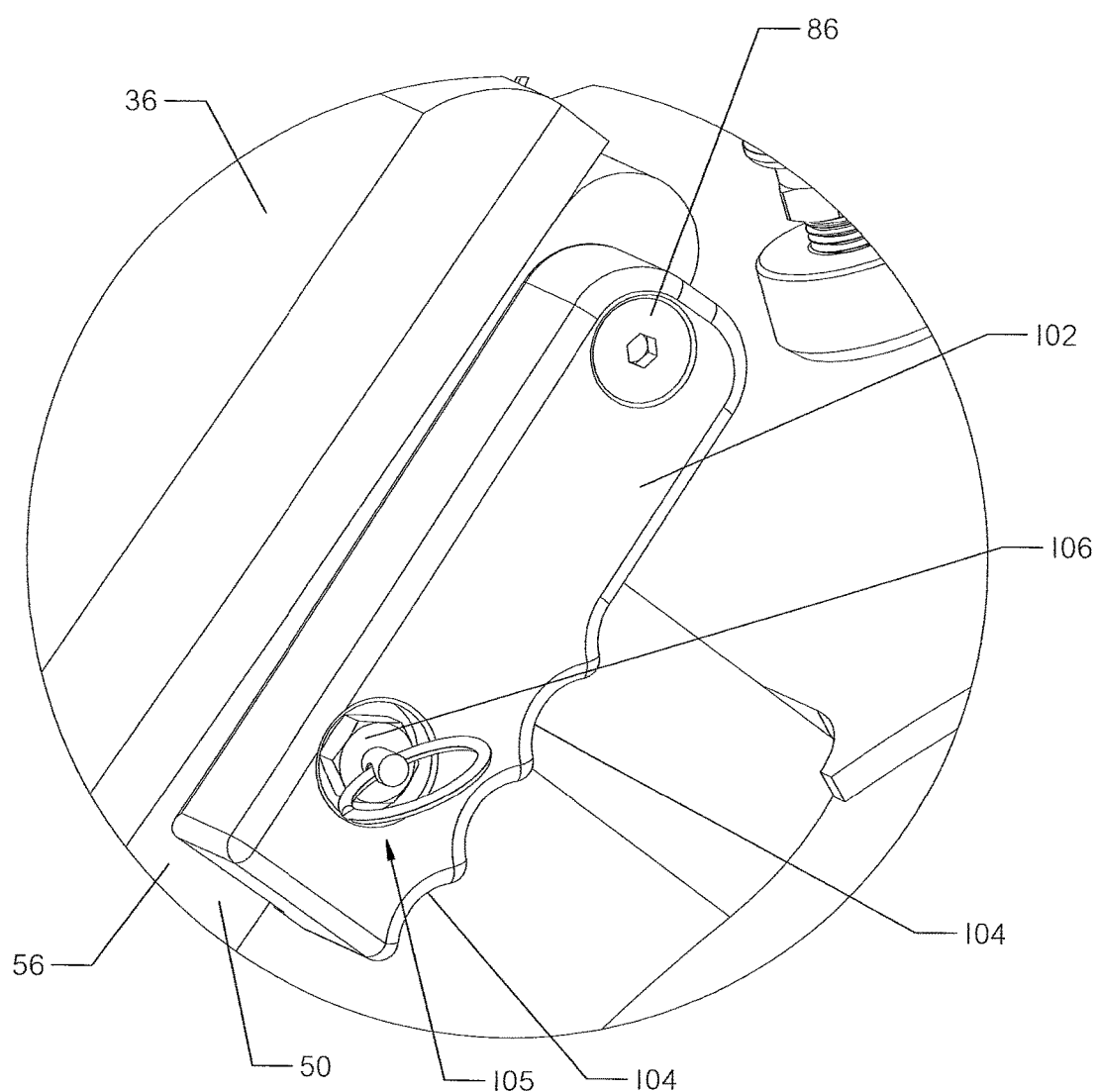
FIG. 16 is an enlarged view of area G shown in FIG. 15.

With reference to FIGS. 15-16, the latch assembly 100 is in the locked position when the handles 102 are adjacent the flange 50. Positioning the handles 102 adjacent the flange 50 when the latch assembly 100 is in the locked position allows each of the handles 102 to be secured to the flange 50 by an independent lock mechanism 105. Securing the handles 102 to the flange 50 provides a back-up lock in case the latch assembly 100 fails.

In one embodiment, the lock mechanism 105 is a plunger 106 that may be disposed within a bore 108 formed in each of the handles 102, as shown in FIG. 18. The plunger 106 is then secured to an opening (not shown) formed in the side edge 52 of the flange 50. In alternative embodiments, the lock mechanism 105 may comprise a threaded fastener or clamp. In alternative embodiments, only one handle 102 may be used instead of two.

Changes may be made in the construction, operation and arrangement of the various parts, elements, steps and procedures described herein without departing from the spirit and scope of the invention as described in the following claims.

The invention claimed is:

1. An apparatus, comprising:
a body having an opening formed therein;
a cover sized to cover the opening; and
a latch assembly, comprising:
    a plurality of spaced and aligned first knuckles formed in a selected one of the cover and body, each first knuckle having an exposed semi-cylindrical groove formed therein;
    a plurality of spaced and aligned second knuckles formed in the unselected one of the cover and body adjacent the opening; and
    a rotatable latch pin having aligned and alternating first and second sections, each first section having a size and shape complementary to the semi-cylindrical groove of a first knuckle.

2. The apparatus of claim 1 in which each second knuckle has a cylindrical passage extending therethrough.

3. The apparatus of claim 2 in which each second section of the latch pin has a size and shape complementary to the cylindrical passage of a second knuckle.

4. The apparatus of claim 1 in which the plurality of first and second knuckles are interlaceable.

5. An apparatus, comprising:
a pressurized inversion drum; and
the apparatus of claim 1, in which the body and opening are those of the pressurized inversion drum.

6. An apparatus, comprising:
a drum having an opening; and
the apparatus of claim 1 positioned over the opening.

7. The apparatus of claim 1 in which a series of semi-cylindrical grooves are formed in the body between each second knuckle.

8. A system, comprising:
the apparatus of claim 6; and
a tubular liner contained within the drum.

9. The apparatus of claim 1 in which the latch pin is attached to a handle.

10. The apparatus of claim 9 further comprising a lock mechanism attached to the handle.

11. The apparatus of claim 1 further comprising a seal positioned on a bottom surface of the cover that is sized to surround the opening.

12. The apparatus of claim 4 in which the latch assembly is in a locked position when the first and second knuckles are interlaced and each of the first sections of the latch pin are positioned within the grooves formed in each of the first knuckles.

13. The apparatus of claim 7 in which the latch assembly is in an unlocked position when each of the first sections of the latch pin are positioned within the grooves formed in the body between each second knuckle.

14. The apparatus of claim 1 in which the cover is rotatably attached to the body via a hinge joint.

15. The apparatus of claim 1 in which the diameter of each first section is aligned with the longitudinal axis of the latch pin.

16. The apparatus of claim 1 in which each of the first knuckles extend from the bottom surface of the cover.

17. The apparatus of claim 1 in which each of the second knuckles is integral with the body.

18. An apparatus, comprising:
  a body having an opening formed therein;
  a cover sized to cover the opening; and
  a latch assembly, comprising:
    a plurality of first knuckles formed in a selected one of the cover and body;
    a plurality of second knuckles formed in the unselected one of the cover and body adjacent the opening; in which the plurality of first knuckles are configured to interlace with the plurality of second knuckles; and
    a rotatable latch pin having a plurality of half-moon cross-sections.

19. The apparatus of claim 18 in which a semi-cylindrical groove is formed in each of the first knuckles.

20. The apparatus of claim 18 in which a semi-cylindrical groove is formed in the body between each second knuckle.

* * * * *